(No Model.)
H. D. LAYMAN.
COTTON PLANTER.
No. 296,698. Patented Apr. 8, 1884.
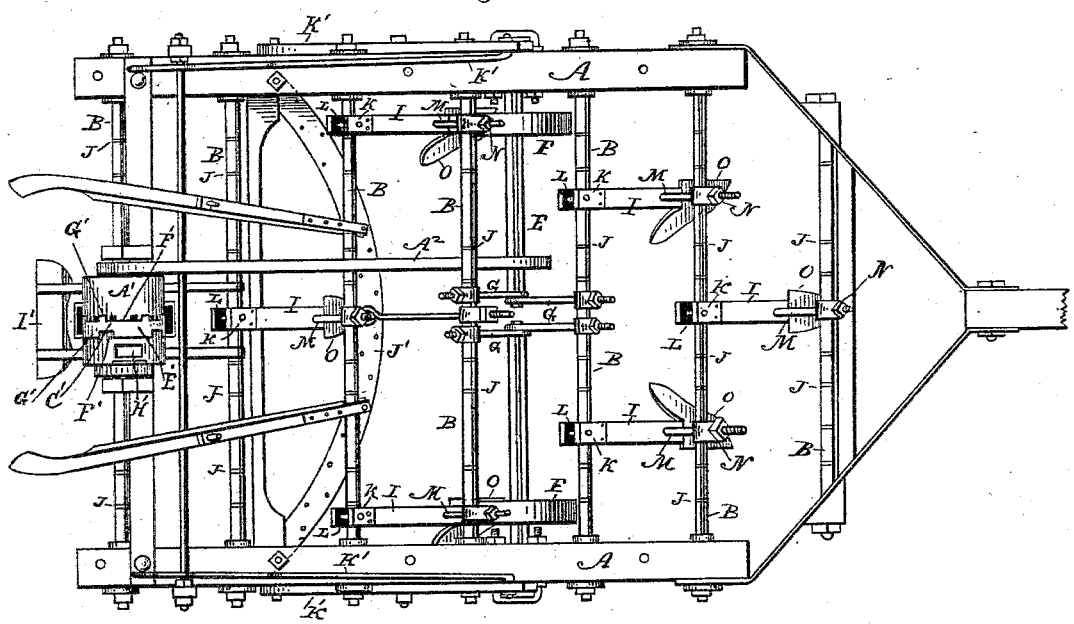
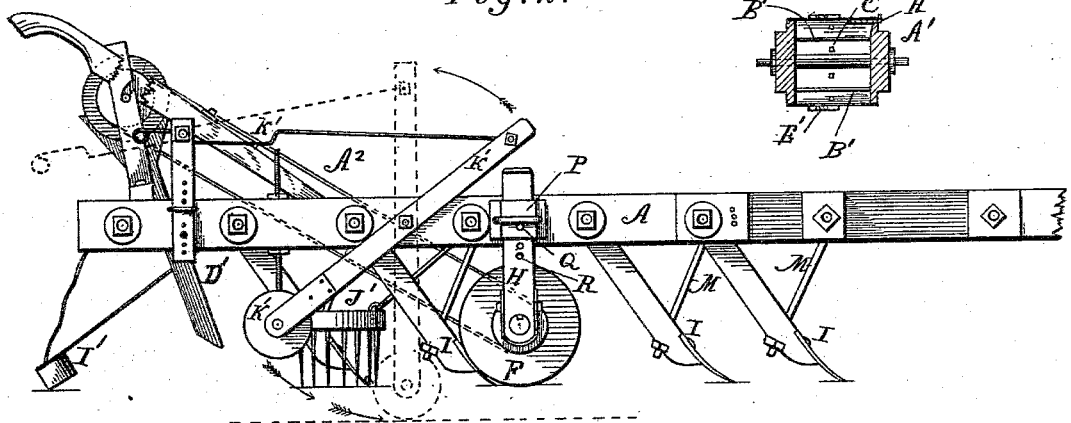
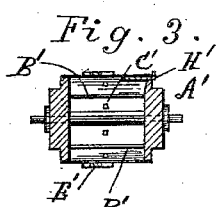
WITNESSES:
Thos. Houghton.
A. G. Lyne
INVENTOR:
H. D. Layman
BY Munn
ATTORNEYS.

UNITED STATES PATENT OFFICE.

HIRAM D. LAYMAN, OF BENTON, ARKANSAS.

COTTON-PLANTER.

SPECIFICATION forming part of Letters Patent No. 296,698, dated April 8, 1884.

Application filed November 9, 1883. (No model.)

*To all whom it may concern:*

Be it known that I, HIRAM D. LAYMAN, of Benton, in the county of Saline and State of Arkansas, have invented a new and useful Improvement in Cotton-Planters, of which the following is a full, clear, and exact description, reference being had to the annexed drawings, forming part of this specification.

This invention relates to cotton-planters; and the invention consists of the construction hereinafter described and claimed.

In the drawings, Figure 1 is a plan view of my cotton-planter. Fig. 2 is a side elevation of the same, and Fig. 3 is a sectional view of the seed-drum.

The frame-work of the cotton-planter consists of the side beams, A, and the connecting cross-rods B. This frame-work is supported on the divided axle or axles E and the wheels F, the axles being supported in adjustable hangers G H, to vary their height from the ground according to the depth the plows are to run. The plows I are connected to the cross-rods B by means of the notches J in the rods and the clips K and bolts L, which latter are placed in engagement with said notches. The plows are supported by stay-rods M, connected to the next foremost rod B, in each particular case by clips O and nuts N. The hangers G of the axles E are connected to rods B in the same manner as the stay-rods M; but the hangers H are supported in clips P by means of a pin, Q, which is set in one of a series of perforations R, registering with a hole in the clip in each case. The six plows I are so arranged as to throw up a ridge of earth and open a central furrow therein for the cotton-seed, which are dropped from the cylindrical seed-drum A', supported at the rear of the planter, and driven by belt A². This drum is provided with longitudinal rods B', for agitating the seeds and distributing them as the drum revolves, and has a series of uniform perforations, C', for the passage of the seeds to the chute D', by which they are conveyed to the furrow.

For regulating the drop, the drum is provided with a band, E', having recesses F' cut in its edges to form lips or projections G', the lips of one edge being wider than those of the other, whereby either one or more holes C' in the drum may be covered by each of the lips when the band is properly shifted both longitudinally and circumferentially on the drum. The drum has a slide-door, H', through which it is to be filled with seeds.

I am aware that a revolving hopper having a notched band for regulating the discharge of the seed is not, broadly, new, and I do not claim such, broadly.

I' is a drag for covering the seeds in the furrow. J' is a harrow for smoothing the bed or ridge before the furrow for the seeds is made, and K' is a device for supporting the plows and wheels above ground when required.

The main frame-work shown in the drawings, which is not claimed in this application, is covered by my application No. 111,322, filed November 9, 1883.

What I claim is—

The combination of the frame, the series of plows I, arranged to throw up a ridge and to open a furrow therein, the cylindrical seed-drum A', having a series of uniform holes, C', therein, the band E', adapted to be shifted both longitudinally and circumferentially of the drum, and having both of its edges recessed to form lips G' therein, the lips of one edge being wider than those of the other, whereby either one or more holes C' may be covered by each lip by the proper adjustment of the band, and the drag I', for covering the seed, substantially as shown and described.

HIRAM D. LAYMAN.

Witnesses:
 A. G. LYNE,
 SOLON C. KEMON.